United States Patent
Sun et al.

(10) Patent No.: US 9,306,653 B2
(45) Date of Patent: Apr. 5, 2016

(54) ENHANCED OPPORTUNISTIC MOBILE RECEIVE DIVERSITY FOR DUAL-SIM DUAL-ACTIVE MOBILE DEVICE

(71) Applicant: QUALCOMM Incorporated, San Diego, CA (US)

(72) Inventors: Jing Sun, San Diego, CA (US); Huang Lou, San Diego, CA (US); Wenjun Li, San Diego, CA (US); Rashid Ahmed Akbar Attar, San Diego, CA (US); Jun Hu, San Diego, CA (US); Francis Ming-Meng Ngai, Louisville, CO (US); Vieri Vanghi, Florence (IT)

(73) Assignee: QUALCOMM INCORPORATED, San Diego, CA (US)

( * ) Notice: Subject to any disclaimer, the term of this patent is extended or adjusted under 35 U.S.C. 154(b) by 58 days.

(21) Appl. No.: 14/293,984

(22) Filed: Jun. 2, 2014

(65) Prior Publication Data

US 2015/0349869 A1 Dec. 3, 2015

(51) Int. Cl.
*H04B 1/04* (2006.01)
*H04B 7/08* (2006.01)
*H04W 88/06* (2009.01)

(52) U.S. Cl.
CPC ............. *H04B 7/08* (2013.01); *H04B 7/0871* (2013.01); *H04W 88/06* (2013.01)

(58) Field of Classification Search
CPC ........ H04W 76/048; H04B 7/08; H04B 7/082
USPC .............. 455/73, 78, 552.1, 553.1, 130, 132, 455/168.1, 277.1
See application file for complete search history.

(56) References Cited

U.S. PATENT DOCUMENTS

| | | | |
|---|---|---|---|
| 8,611,952 B2 | 12/2013 | Clevorn et al. | |
| 8,626,179 B2 | 1/2014 | Ngai | |
| 2014/0146732 A1 | 5/2014 | Olufunmilola et al. | |
| 2015/0257198 A1* | 9/2015 | Su .................... | H04W 52/0216 455/552.1 |

FOREIGN PATENT DOCUMENTS

| | | |
|---|---|---|
| WO | 2012055434 A1 | 5/2012 |
| WO | 2013007869 A1 | 1/2013 |
| WO | 2013027088 A1 | 2/2013 |
| WO | 2013150171 A1 | 10/2013 |

OTHER PUBLICATIONS

International Search Report and Written Opinion—PCT/US2015/026602—ISA/EPO—Jun. 26, 2015.

* cited by examiner

*Primary Examiner* — Tuan Pham
(74) *Attorney, Agent, or Firm* — Procopio, Cory, Hargreaves & Savitch LLP

(57) ABSTRACT

A method for performing mobile receive diversity may include: enabling a first receive chain associated with a first radio access technology (RAT) to receive one or more signals from a second RAT; receiving second RAT signals on a second receive chain; enabling receive diversity on a modem associated with a second receive chain; generating, by a diversity receiver, a receive diversity signal based on the one or more second RAT signals received by the first receive chain during periods of time the first receive chain does not receive a signal from the first RAT; and outputting the generated receive diversity signal to a decoder for the second RAT.

27 Claims, 7 Drawing Sheets

ENHANCED OPPORTUNISTIC MOBILE RECEIVE DIVERSITY FOR DUAL-SIM DUAL-ACTIVE MOBILE DEVICE

BACKGROUND

In Dual-Subscriber Identity Module (SIM), Dual-Active (DSDA) mobile devices supporting Wideband Code Division Multiple Access (WCDMA) and Global System for Mobile communications (GSM) radio access technologies, Opportunistic Mobile Receive Diversity (OMRD) provides WCDMA receive diversity only when GSM is in sleep mode. When GSM is in traffic, i.e., when GSM is using its receiver during a voice or data call, making the GSM receiver chain unavailable to WCDMA so receive diversity cannot be accomplished for WCDMA.

GSM, however, has a low receive duty cycle in traffic so for a large portion of the time when GSM is in traffic GSM is not actively using its receiver chain. During those portions of time, the GSM receiver chain may be used by WCDMA. Conventional designs for OMRD use diversity/non-diversity mode switching involving a large amount of software overhead making conventional OMRD impractical for frequent switching from the GSM receive duty cycle.

SUMMARY

Apparatuses and methods for enhanced opportunistic receive diversity are provided.

According to various embodiments there is provided a method for performing mobile receive diversity. The method may include: enabling a first receive chain associated with a first radio access technology (RAT) to receive one or more signals from a second RAT; receiving second RAT signals on a second receive chain; enabling receive diversity on a modem associated with a second receive chain; generating, by a diversity receiver, a receive diversity signal based on the one or more second RAT signals received by the first receive chain during periods of time the first receive chain does not receive a signal from the first RAT; and outputting the generated receive diversity signal to a decoder for the second RAT.

According to various embodiments there is provided a wireless communication device. The wireless communication device may include: a first receive chain configured to receive one or more signals from a first radio access technology (RAT); a second receive chain configured to receive one or more signals from a second RAT; a diversity receiver configured to generate a receive diversity signal; and a control unit.

The control unit may be configured to: cause the first receive chain to receive one or more signals from the second RAT; cause the diversity receiver to generate the receive diversity signal during periods of time the first receive chain does not receive a signal on the first RAT based on the one or more second RAT signals received by the first receive chain; and cause the diversity receiver to output the generated receive diversity signal to a decoder for the second RAT.

According to various embodiments there is provided a wireless communication device. The wireless communication device may include: means for receiving one or more signals from a second radio access technology (RAT) on a first receive chain associated with a first RAT; means for generating a receive diversity signal based on the one or more second RAT signals received by the first receive chain during periods of time the first receive chain does not receive a signal from the first RAT; and means for outputting the generated receive diversity signal.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which:

FIGS. 2A-2C are diagrams illustrating time slots for GSM operation according to various embodiments;

DETAILED DESCRIPTION

Enhanced OMRD (eOMRD) may extend the availability of receive diversity for WCDMA when GSM is in traffic and may provide higher Mobile Receive Diversity utility when GSM is in idle wakeup.

Figure 1:
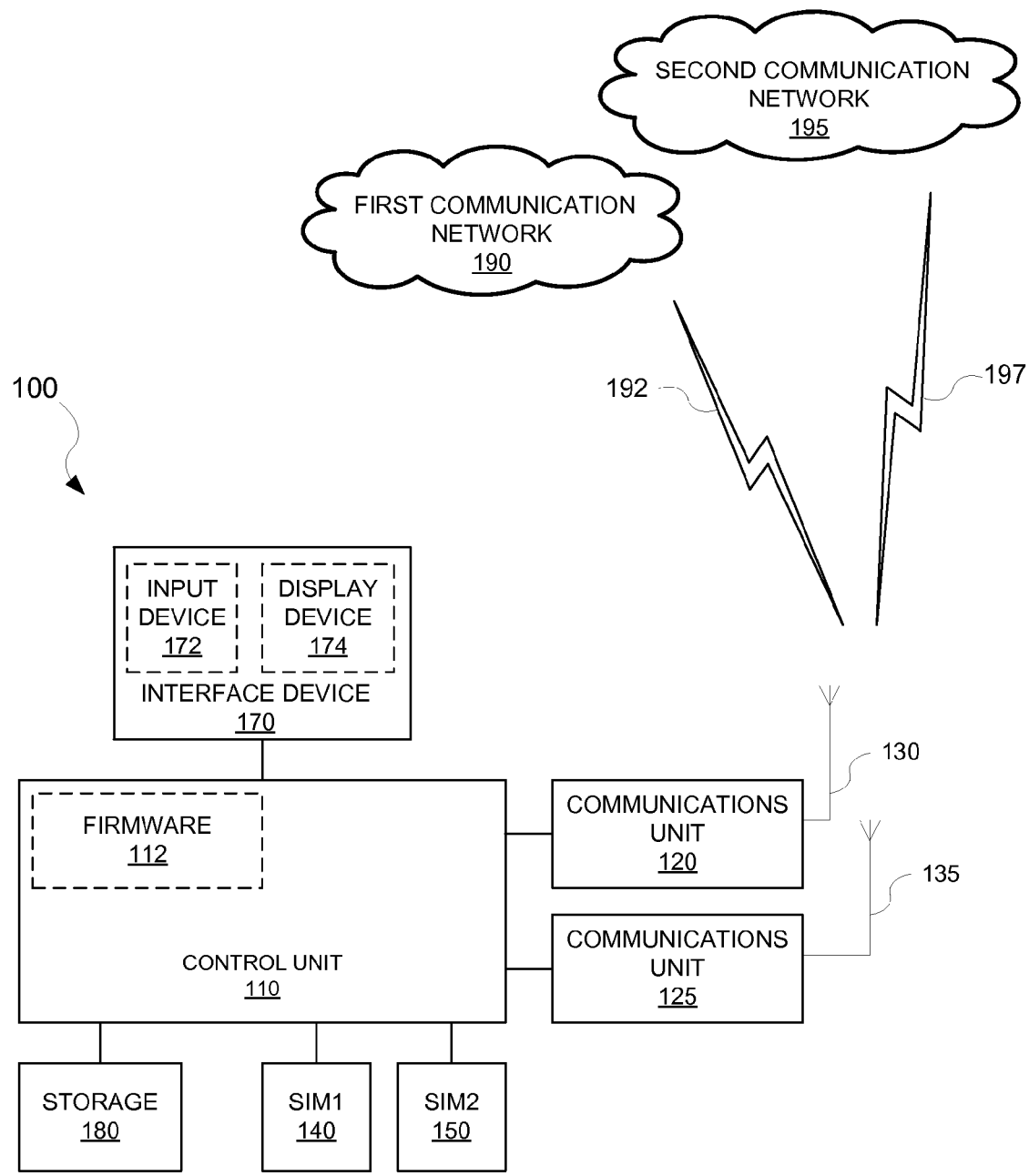
FIG. 1 is a block diagram illustrating a DSDA wireless communication device according to various embodiments.

FIG. 1 is a block diagram illustrating a wireless communication device 100 according to various embodiments. As illustrated in FIG. 1, the wireless communication device 100 may include a control unit 110, a first communications unit 120, a second communications unit 125, a first antenna 130, a second antenna 135, a first SIM 140, a second SIM 150, a user interface device 170, a timing management unit 175, and a storage 180.

The wireless communication device 100 may be, for example but not limited to, a mobile telephone, smartphone, tablet, computer, etc., capable of communications with one or more wireless networks. One of ordinary skill in the art will appreciate that the wireless communication device 100 may include one or more transceivers (communications units) and may interface with one or more antennas without departing from the scope of the present inventive concept.

The first communications unit 120 may include, for example, but not limited to, a first transceiver (not shown). The second communications unit 125 may include, for example, but not limited to, a second transceiver (not shown). In active mode, a transceiver receives and transmits signals. In idle mode, a transceiver receives but does not transmit signals.

A SIM (e.g., 140, 150) in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the multi-SIM, Multi-Active (MSMA) communication device, and thus need not be a separate or removable circuit, chip, or card.

A SIM used in various embodiments may store user account information, an International Mobile Subscriber Identity (IMSI), a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The first SIM 140 may associate the first communications unit 120 with a first subscription (Sub1) 192 on a first communication network 190 and the second SIM 150 may associate the second communications unit 125 with a second subscription (Sub2) 197 on a second communication network 195. In active mode, a communications unit receives and transmits signals. In idle mode, a communications unit receives but does not transmit signals. For convenience, throughout this disclosure Sub1 is associated with the first communications unit 120 and Sub2 is associated with the second communications unit 125. One of ordinary skill in the art will appreciate that either subscription may be associated with either communications unit without departing from the scope of the present inventive concept.

The first communication network 190 and the second communication network 195 may be operated by the same or different service providers, and/or may support the same or different radio access technologies (RATs), for example, but not limited to, WCDMA/1x/DO, long term evolution (LTE), and GSM. For convenience in explaining the various embodiments, throughout this disclosure Sub1 192 is a GSM subscription, also referred to as a first RAT 192, and Sub2 197 is a WCDMA/1x/DO subscription, also referred to as a second RAT 197.

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may control overall operation of the wireless communication device 100 including control of the first communications unit 120, the second communications unit 125, the user interface device 170, and the storage 180. The control unit 110 may be a programmable device, for example, but not limited to, a microprocessor or microcontroller.

The timing management unit 175 (refer to FIGS. 3A-3B) may provide timing information about transmit/receive activity.

The storage 180 may store application programs necessary for operation of the wireless communication device 100 that are executed by the control unit 110, as well as application data and user data.

Various embodiments extend the availability of receive diversity for the second RAT 197 (e.g., WCDMA/1x/DO) receive chain when the first RAT 192 (e.g., GSM) receive chain is in traffic and provide higher receive diversity utility when the first RAT 192 receive chain is in idle wakeup. While the present disclosure describes example embodiments with respect to GSM and WCDMA radio access technologies, one of ordinary skill in the art will appreciate that the present inventive concept may be applied to any Time Division Duplex (TDD), Wireless Wide Area Network (WWAN), or Wireless Local Area Network (WLAN) technologies.

Enhanced OMRD may be applied during a plurality of contiguous time slots for a first RAT 192 having a combined duration sufficient for reception as well as tuning overhead for a second RAT 197 during which the first RAT 192 is not either receiving or transmitting. In various embodiments, a minimum receive time for a second RAT 197 may be 1 mS, tuning time from the first RAT 192 to the second RAT 197 may be approximately 200 μS, and tuning time back to the first RAT 192 from the second RAT 197 may be approximately 200 μS. In other embodiments, other suitable time intervals may be implemented.

Figures 2A, 2B, 2C:
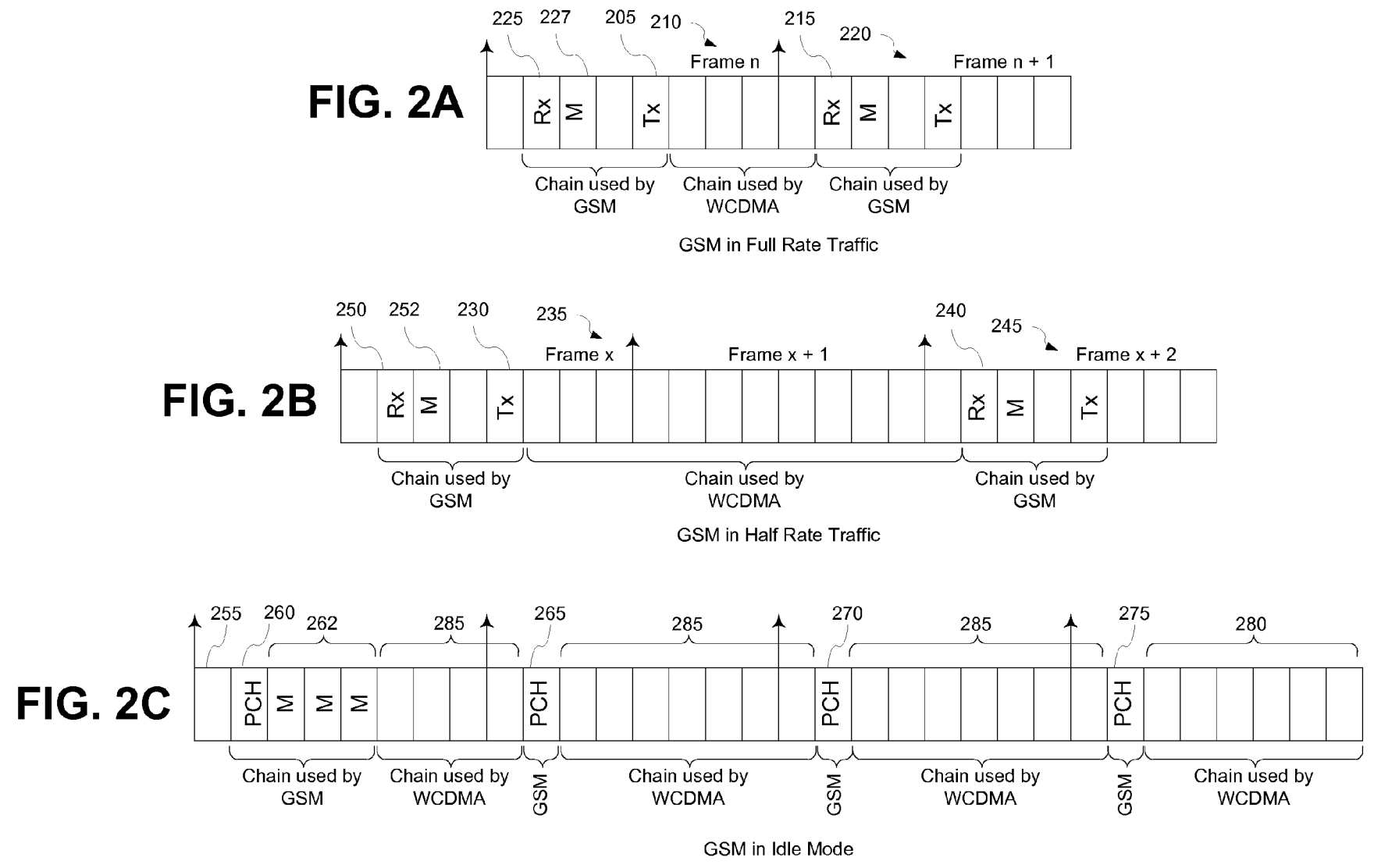

When the receive chain for the first RAT 192 is in traffic, i.e., a voice or data call is in process, the first RAT 192 is not using the associated receive chain a large portion of time. Therefore, the receive chain for the first RAT 192 may be available to be used by the second RAT 197. FIGS. 2A-2C are diagrams illustrating time slots for GSM operation according to various embodiments.

In full rate traffic, the receive chain for the first RAT 192 (FIG. 1) (e.g., GSM) is only receiving communication signals and/or performing power monitoring in selected time slots during each frame for full rate traffic. Further, power monitoring may not occur in each frame. Referring to FIGS. 1 and 2A, when the receive chain for the first RAT 192 is in full rate traffic, eOMRD for the second RAT 197 (e.g., WCDMA/1x/DO) may take place between the last uplink (UL) time slot 205 for the first RAT 192 in frame n 210 and the first downlink (DL) time slot 215 for the first RAT 192 in frame n+1 220 for embodiments in which the first RAT 192 operates in fixed full duplex mode, i.e., transmit and receive are tuned to the same frequency.

For various embodiments where the first RAT 192 does not operate in fixed full duplex mode, i.e., the transmit frequency and receive frequency are not tuned to the same frequency, eOMRD for the second RAT 197 may take place between the last power monitor time slot 227 for the first RAT 192 in frame n 210 and the first DL time slot 215 for the first RAT 192 in frame n+1 220.

In half rate traffic, the receive chain for the first RAT 192 is only receiving communication signals and/or performing power monitoring in selected time slots during every other frame. As illustrated in FIGS. 1 and 2B, when the first RAT 192 is in half rate traffic, eOMRD for the second RAT 197 may take place between the last UL time slot 230 for the first RAT 192 in frame x 235 and the first DL time slot 240 for the first RAT 192 in frame x+2 245 for embodiments in which the first RAT 192 operates in fixed full duplex mode.

For various embodiments in which the first RAT 192 does not operate in fixed full duplex mode, eOMRD for the second RAT 197 may take place between the last power monitor time slot 252 for the first RAT 192 in frame x 235 and the first DL time slot 240 for the first RAT 192 in frame x+2 245.

A variable number of paging channel (PCH) time slots and a variable number of power monitor time slots may occur in each paging cycle. During idle wakeup for the first RAT 192, the receive chain for the first RAT 192 is only receiving in selected time slots. Referring to FIGS. 1 and 2C, in various embodiments eOMRD for the second RAT 197 may take place during the time slots 255 before a first PCH burst 260, during empty times slots 280 after a last PCH burst 270, as well as during empty time slots 285 not being used for power monitoring 262 when the first RAT 192 is not using the associated receive chain.

Figure 3A:
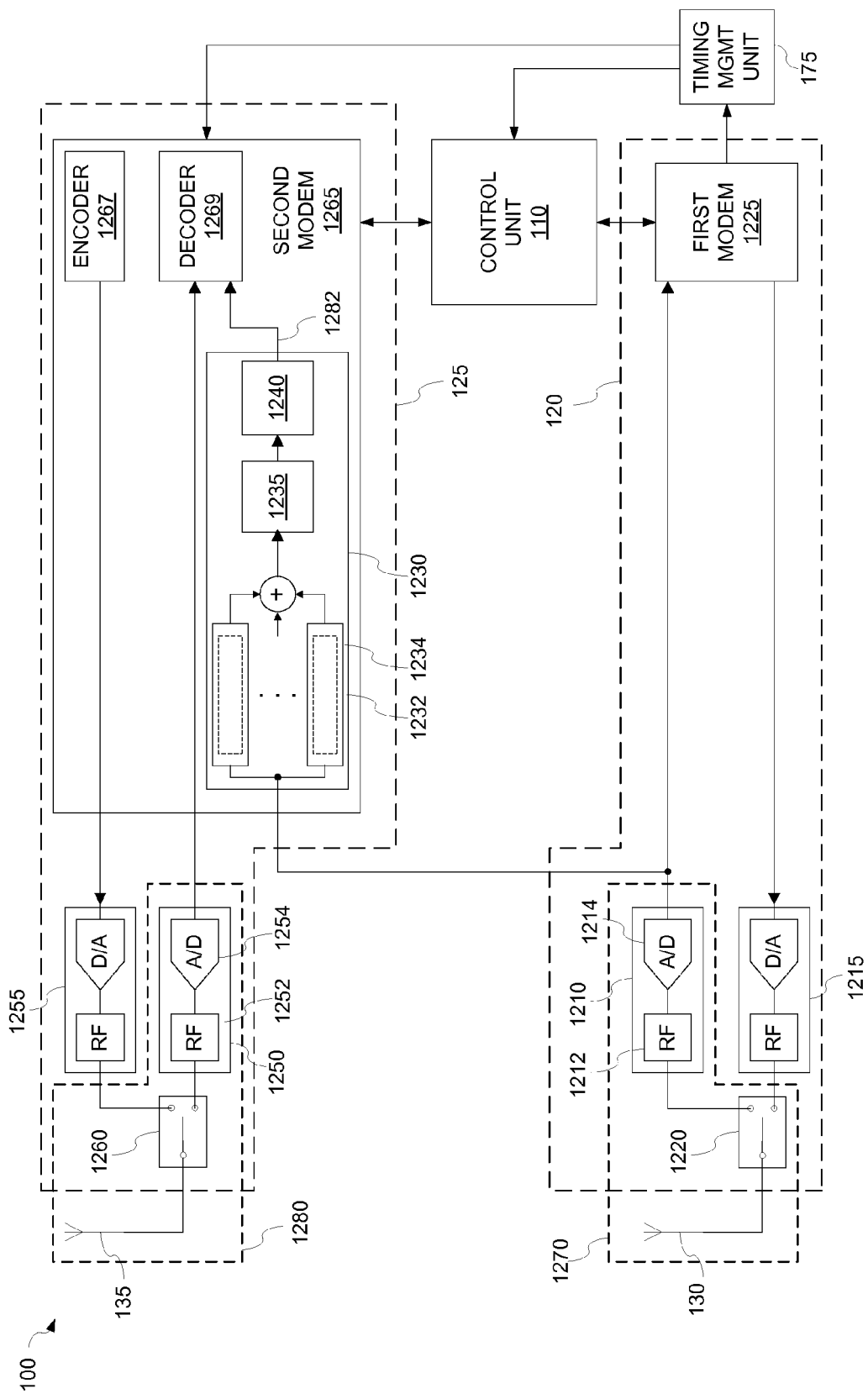
FIG. 3A is a block diagram illustrating first and second communications units and receive chains for a wireless communication device according to various embodiments.

Various embodiments may use diversity receive blanking instead of switching between diversity mode and non-diversity mode. FIG. 3A is a block diagram illustrating the first and second communications units 120, 125 (FIG. 1) for the wireless communication device 100 according to various embodiments.

Referring to FIGS. 1-3A, the first communications unit 120 may include a first receiver 1210, a first transmitter 1215, a first radio frequency (RF) switch 1220, and a first modem 1225. A first receive chain 1270 may include the first antenna 130, and the first receiver 1210. The first receiver 1210 may include a first RF section 1212 and a first analog-to-digital converter (A/D) 1214. The first receive chain 1270 may be associated with a RAT, such as the first RAT 192 (e.g., GSM) and may be configured to receive signals on the first RAT 192. The first receive chain 1270 may also be configured to receive one or more signals on a RAT, such as the second RAT 197 (e.g., WCDMA/1x/DO).

The second communications unit 125 may include a second receiver 1250, a second transmitter 1255, a second RF switch 1260, and a second modem 1265. The second receiver 1250 may include a second RF section 1252 and a second analog-to-digital converter (A/D) 1254. A second receive chain 1280 may include the second antenna 135 and the second receiver 1250. The second receive chain 1280 may be associated with the second RAT 197 (e.g., WCDMA/1x/DO) and may be configured to receive signals on the second RAT 197.

The second modem 1265 may include an encoder 1267 configured to encode signals for transmission, a decoder 1269 configured to decode received signals, and a diversity receiver 1230. The diversity receiver 1230 may be configured to generate a receive diversity signal 1282 based on one or more second RAT 197 signals received from the first receive chain 1270 and may output the receive diversity signal 1282 to the decoder 1269.

The diversity receiver 1230 may include a sample memory 1235, an automatic gain control (AGC) unit 1240 configured to control gain of the receive diversity signal 1282, and a plurality of receiver fingers 1232 (also referred to as rake fingers). Each of the plurality of receiver fingers 1232 may include a plurality of estimation filters 1234, for example, but not limited to, one or more of interference cancellation filters, channel estimation filters, energy filters, noise filters, timing tracking filters, and frequency tracking filters (not shown individually). Outputs from the receiver fingers 1232 may be combined to generate the receive diversity signal samples that are stored in the sample memory 1235 and weighted (i.e., amplified) by the AGC unit 1240.

The timing management unit 175 may provide first RAT 192 transmit/receive activity timing information about the first receive chain 1270 to the control unit 110 and the second modem 1265. The control unit 110 may enable diversity mode for the second modem 1265, and the second modem 1265 may remain in diversity mode. The control unit 110 may include firmware 112 configured to enabling/disabling of diversity mode for the first receive chain 1270 and the second modem 1265. Alternatively or additionally, firmware configured to enabling/disabling of diversity mode may be implemented separate from the control unit 110.

The timing management unit 175 may communicate the time periods, including tuning overhead, during each frame when the first receive chain 1270 receives signals on the first RAT 192. The control unit 110 may cause the second modem 1265 to blank reception of the receive diversity signal 1282 during the time the first receive chain 1270 is in use to receive signals on the first RAT 192.

Figure 3B:
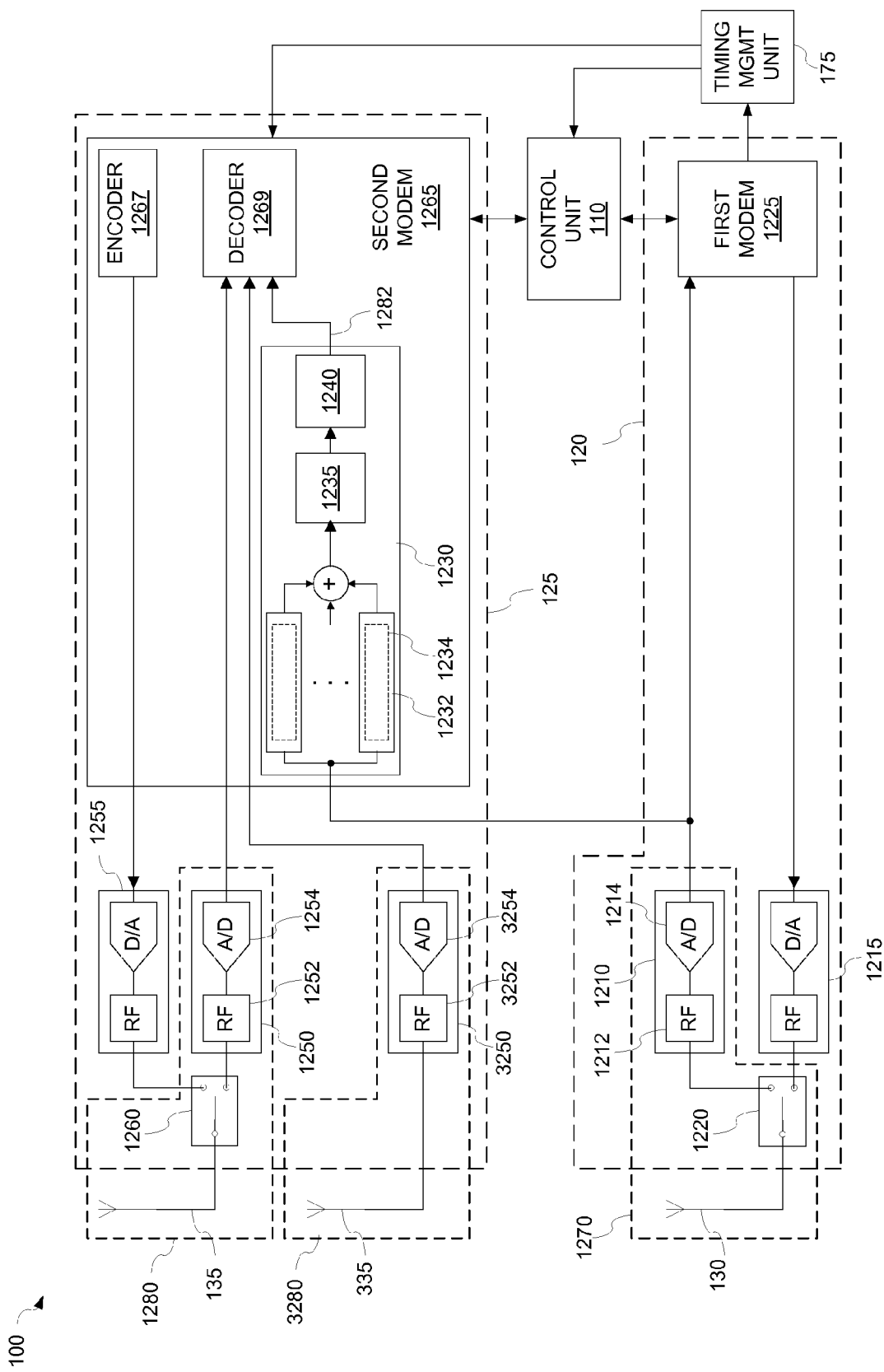
FIG. 3B is a block diagram illustrating a second communications units for a wireless communication device having two receive chains according to various embodiments.

In various embodiments, the second communications unit 125 may include more than one receive chain. FIG. 3B is a block diagram illustrating a second communications unit 125 for a wireless communication device (e.g., 100 in FIG. 1) having two receive chains according to various embodiments.

Referring to FIGS. 1-3B, a third receive chain 3280 may include a third antenna 335, and a third receiver 3250. The third receiver 3250 may include a third RF section 3252 and a third A/D 3254. The third receive chain 3280 may be associated with the second RAT 197 and may be configured to receive signals on the second RAT 197. When first receive chain 1270 configured to receive second RAT 197 signals, 3-way diversity may be implemented for the second RAT 197.

One of ordinary skill in the art will appreciate that the scope of the present inventive concept will include mobile communications devices having multiple receive chains.

Figure 4:
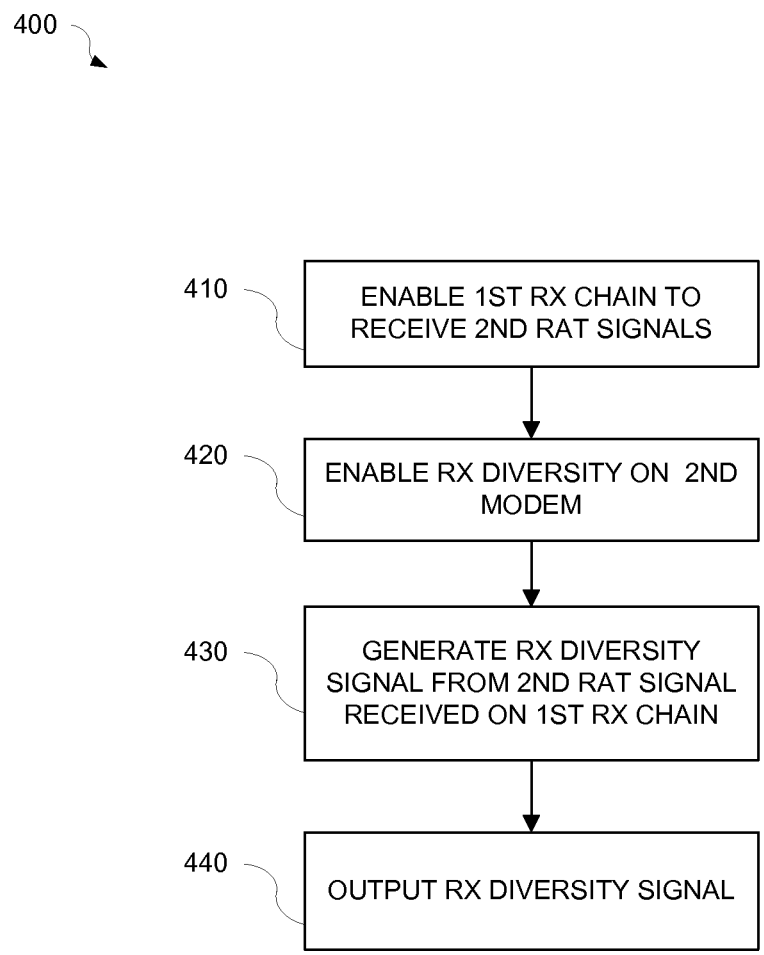
FIG. 4 is a flowchart illustrating a receive diversity method according to various embodiments.

FIG. 4 is a flowchart illustrating a receive diversity method 400 according to various embodiments. With reference to FIGS. 1-4, the control unit 110 may enable the first receive chain 1270 to receive one or more signals on the second RAT 197 during time slots when the first RAT 192 is not communicating with the first receive chain 1270 (e.g., refer to FIG. 2) (410) and may enable receive diversity on the second modem 1265 (420). The second modem 1265 may remain in diversity mode regardless of whether diversity mode is enabled or disabled for the first receive chain 1270.

The second modem 1265 may receive second RAT 197 signals from the second receive chain 1280. The second modem 1265 may also receive second RAT 197 signals from one or more additional receive chains, for example, but not limited to, the third receive chain 3280.

The diversity receiver 1230 may generate a receive diversity signal 1282 based on the one or more second RAT 197 signals received on the first receive chain 1270 (430). The receive diversity signal 1282 may be output to the decoder 1269 (440).

Figure 5:
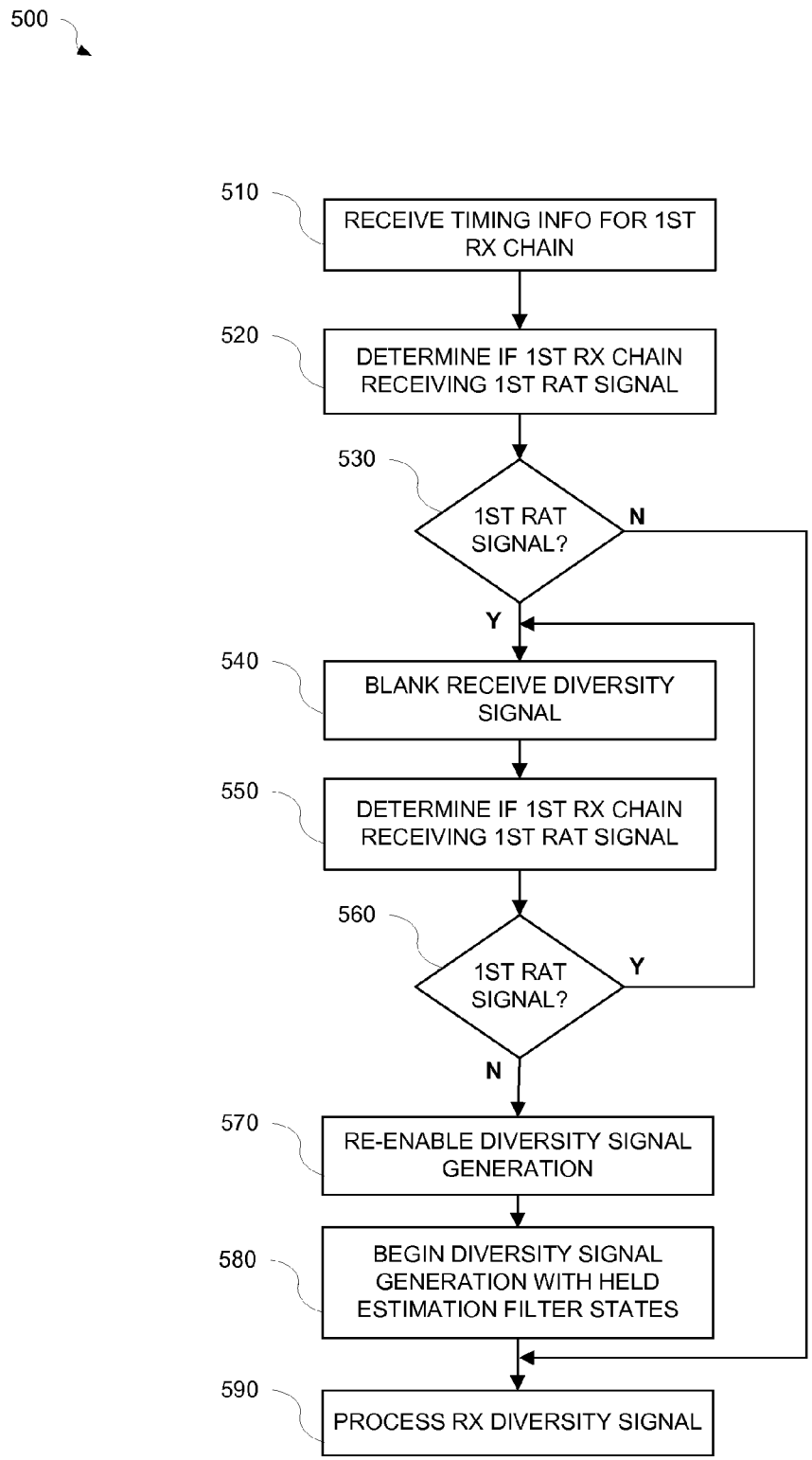
FIG. 5 is a flowchart illustrating a method for receive diversity signal blanking according to various embodiments.

FIG. 5 is a flowchart illustrating a method 500 for receive diversity signal blanking according to various embodiments. Referring to FIGS. 1-5, the timing management unit 175 may obtain timing information about receive and/or transmit timing from the first receive chain 1270 when the first receive chain 1270 is configured to transmit and/or receive signals on the first RAT 192 (510). The timing management unit 175 may provide the timing information to the control unit 110 and the second modem 1265, and based on the timing information a determination may be made as to whether the first receive chain 1270 is in process of receiving a signal on the first RAT 192 (520).

If the first receive chain 1270 is not in process of receiving a signal on the first RAT 192 (530-N), the decoder 1269 may process the receive diversity signal 1282 received from the diversity receiver 1230 (580). If the first receive chain 1270 is in process of receiving a signal on the first RAT 192 (530-Y), the receive diversity signal 1282 may be blanked by the second modem 1265 (540).

During blanking, the control unit 110 may disable reception of signals from the first receive chain 1270 by the plurality of receiver fingers 1232 of the diversity receiver 1230, suspend operation of the AGC unit 1240, suspend writing of receive diversity signal samples into the sample memory 1235, zero out receive diversity signal sample values, and hold the states of the estimation filters 1234 for the plurality of receiver fingers 1232. The held states of the estimation filters 1234 for the plurality of receiver fingers 1232 may include, for example, but not limited to, the states of one or more of the interference cancellation filters, channel estimation filters, energy filters, noise filters, timing tracking filters, and frequency tracking filters. The plurality of receiver fingers 1232 may not be de-assigned.

The timing management unit 175 may continue to obtain timing information about the first receive chain 1270 and a determination may be made as to whether the first receive chain 1270 is still in process of receiving signals on the first RAT 192 (550). If the first receive chain 1270 is still in process of receiving signals on the first RAT 192 (560-Y), blanking of the receive diversity signal 1282 may continue (540).

If the timing information obtained by the timing management unit 175 indicates that the first receive chain 1270 is no longer being used to receive signals on the first RAT 192 (560-N), the control unit 110 may re-enable the first receive chain 1270 to receive one or more signals on the second RAT 197, and re-enable the plurality of receiver fingers 1232 of the diversity receiver 1230 to receive the one or more signals from the first receive chain 1270 (570). The diversity receiver 1230 may begin generating a receive diversity signal 1282 using the states of the estimation filters 1234 for the plurality of receiver fingers 1232 that were held when diversity was disabled (580). The decoder 1269 may process the receive diversity signal 1282 (590).

Figure 6:
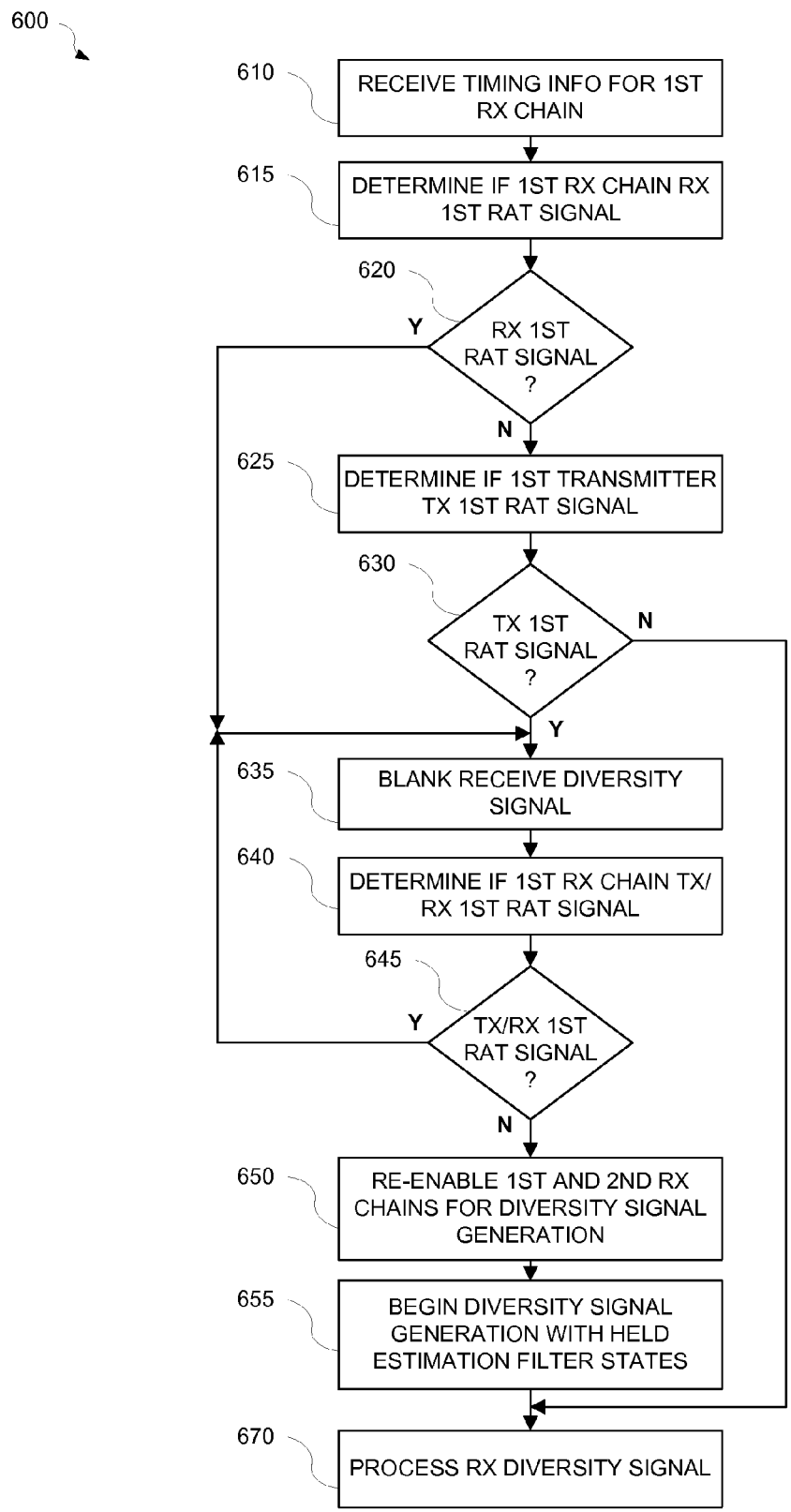
FIG. 6 is a flowchart illustrating another method for receive diversity signal blanking according to various embodiments.

FIG. 6 is a flowchart illustrating another method 600 for receive diversity signal blanking according to various embodiments. Referring to FIGS. 1-6, the timing management unit 175 may obtain timing information about receive and transmit timing from the first receive chain 1270 when the first receive chain 1270 is configured to transmit and receive signals on the first RAT 192 (610). The timing management unit 175 may provide the timing information to the control unit 110 and the second modem 1265 and based on the timing information a determination may be made as to whether the first receive chain 1270 is in process of receiving a signal on the first RAT 192 (615).

If the first receive chain 1270 is not in process of receiving a signal on the first RAT 192 (620-N), a determination may be made as to whether the first transmitter 1215 is in process of transmitting a signal on the first RAT 192 (625). If the first transmitter 1215 is not in process of transmitting a signal on the first RAT 192 (630-N), the decoder 1269 may process the receive diversity signal 1282 received from the diversity receiver 1230 (655).

If the first receive chain 1270 is in process of receiving a signal on the first RAT 192 (620-Y) or the first transmitter 1215 is in process of transmitting a signal on the first RAT 192 (630-Y), the receive diversity signal 1282 may be blanked by the second modem 1265 (635).

During blanking, the control unit 110 may disable reception of the one or more signals from the first receive chain 1270 by the plurality of receiver fingers 1232 of the diversity receiver 1230, suspend operation of the AGC unit 1240, suspend writing of receive diversity signal samples into the sample memory 1235, zero out receive diversity signal sample values, and hold the states of the estimation filters 1234 for the plurality of receiver fingers 1232. The held states of the estimation filters 1234 for the plurality of receiver fingers 1232 may include, for example, but not limited to, the states of one or more of the interference cancellation filters, channel estimation filters, energy filters, noise filters, timing tracking filters, and frequency tracking filters. The plurality of receiver fingers 1232 may not be de-assigned.

The timing management unit 175 may continue to obtain timing information about the first receive chain 1270 and a determination may be made as to whether the first receive chain 1270 is still in process of receiving signals on the first RAT 192 or the first transmitter 1215 is still transmitting signals on the first RAT 192 (640). If the first receive chain 1270 is still in process of receiving signals on the first RAT 192 or the first transmitter 1215 is still transmitting signals on the first RAT 192 (645-Y), blanking of the receive diversity signal 1282 may continue (635).

If the timing information obtained by the timing management unit 175 indicates that the first receive chain 1270 is no longer being used to receive or transmit signals on the first RAT 192 (645-N), the control unit 110 may re-enable the first receive chain 1270 to receive one or more signals on the second RAT 197, and re-enable the plurality of receiver fingers 1232 of the diversity receiver 1230 to receive the one or more signals from the first receive chain 1270 (650). The diversity receiver 1230 may begin generating a receive diversity signal 1282 using the states of the estimation filters 1234 for the plurality of receiver fingers 1232 that were held when diversity was disabled (655). The decoder 1269 may process the receive diversity signal 1282 (660).

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for performing mobile receive diversity, the method comprising:
    enabling a first receive chain associated with a first radio access technology (RAT) to receive one or more signals from a second RAT;
    receiving second RAT signals on a second receive chain;
    enabling receive diversity on a modem associated with the second receive chain;
    generating, by a diversity receiver, a receive diversity signal based on the one or more second RAT signals received by the first receive chain during periods of time the first receive chain does not receive a signal from the first RAT; and
    outputting the generated receive diversity signal to a decoder for the second RAT.

2. The method of claim 1, further comprising blanking the receive diversity signal during periods of time the first receive chain receives a signal from the first RAT.

3. The method of claim 2, further comprising:
    receiving timing information about the first receive chain; and
    determining the periods of time the first receive chain does not receive a signal from the first RAT based on the received timing information.

4. The method of claim 3, wherein the timing information comprises information about periods of time the first receive chain receives a signal from the first RAT.

5. The method of claim 3, wherein the timing information comprises information about periods of time a first transmitter associated with the first receive chain transmits a signal on the first RAT.

6. The method of claim 5, further comprising blanking the receive diversity signal during the periods of time the first transmitter associated with the first receive chain transmits a signal on the first RAT.

7. The method of claim 2, wherein the blanking comprises:
    suspending reception by the diversity receiver of the one or more second RAT signals from the first receive chain;
    suspending automatic gain control for the receive diversity signal;
    suspending writing of receive diversity signal samples into sample memory;
    zeroing out receive diversity signal sample values; and
    holding estimation filter states for a plurality of estimation filters.

8. The method of claim 7, wherein the estimation filter states comprise one or more of an interference cancellation filter state, a channel estimation filter state, an energy filter state, a noise filter state, a timing tracking filter state, and a frequency tracking filter state.

9. The method of claim 7, further comprising:
    receiving the timing information about the first receive chain;
    determining the periods of time the first receive chain does not receive a signal from the first RAT based on the received timing information; and
    re-enabling generation of the receive diversity signal during the periods of time the first receive chain does not receive a signal from the first RAT.

10. The method of claim 9, wherein when receive diversity is re-enabled, generation of the receive diversity signal begins with the held estimation filter states.

11. The method of claim 1, wherein the first RAT is Global System for Mobile communications (GSM) and the second RAT is Wideband Code Division Multiple Access (WCDMA).

12. The method of claim 1, wherein the first RAT is different from the second RAT.

13. The method of claim 1, further comprising:
    receiving one or more second RAT signals on a third receive chain associated with the second modem;
    outputting the one or more second RAT signals received on the third receive chain to the decoder for the second modem; and
    performing 3-way receive diversity with the one or more second RAT signals received on the first receive chain, the second receive chain, and the third receive chain.

14. A wireless communication device, comprising:
a first receive chain configured to receive one or more signals from a first radio access technology (RAT);
a second receive chain configured to receive one or more signals from a second RAT;
a diversity receiver configured to generate a receive diversity signal; and
a control unit configured to:
cause the first receive chain to receive one or more signals from the second RAT;
cause the diversity receiver to generate the receive diversity signal during periods of time the first receive chain does not receive a signal on the first RAT based on the one or more second RAT signals received by the first receive chain; and
cause the diversity receiver to output the generated receive diversity signal to a decoder for the second RAT.

15. The wireless communication device according to claim 14, wherein the control unit is configured to blank the receive diversity signal during the periods of time the first receive chain receives a signal from the first RAT.

16. The wireless communication device according to claim 15, further comprising:
a timing management unit configured to obtain timing information from the first receive chain,
wherein the control unit is configured to determine the periods of time the first receive chain does not receive a signal from the first RAT based on the timing information received from the timing management unit.

17. The wireless communication device according to claim 16, wherein the timing information comprises information about periods of time the first receive chain receives a signal from the first RAT.

18. The wireless communication device according to claim 16, wherein the timing information comprises information about periods of time a first transmitter associated with the first receive chain transmits a signal on the first RAT.

19. The wireless communication device according to claim 18, wherein the control unit is configured to blank the receive diversity signal during the periods of time the transmitter associated with the first receive chain transmits a signal on the first RAT.

20. The wireless communication device according to claim 15, wherein the diversity receiver comprises:
a plurality of receiver fingers comprising a plurality of estimation filters, the plurality of receiver fingers configured to input the one or more signals from the second RAT received by the first receive chain and output a receive diversity signal sample;
a sample memory configured to store receive diversity signal samples comprising the receive diversity signal; and
an automatic gain control unit configured to control gain of the receive diversity signal.

21. The wireless communication device according to claim 20, wherein the plurality of estimation filters comprises one or more of an interference cancellation filter, a channel estimation filter, an energy filter, a noise filter, a timing tracking filter, and a frequency tracking filter.

22. The wireless communication device according to claim 21, wherein in response to a determination that the first receive chain receives a signal from the first RAT, the control unit is configured to:
suspend reception by the diversity receiver of the one or more second RAT signals from the first receive chain;
suspend operation of the automatic gain control unit for the receive diversity signal;
suspend writing of receive diversity signal samples into the sample memory;
zero out receive diversity signal sample values output from the plurality of receiver fingers; and
cause the estimation filters to hold their filter states.

23. The wireless communication device according to claim 22, wherein in response to a determination that the first receive chain does not receive a signal from the first RAT, the control unit is configured to re-enable generation of the receive diversity signal during the periods of time the first receive chain does not receive a signal from the first RAT.

24. The wireless communication device according to claim 23, wherein in response to a determination that the first receive chain does not receive a signal from the first RAT, the control unit is configured cause the diversity receiver to begin generation of the receive diversity signal with the held estimation filter states.

25. The wireless communication device according to claim 14, wherein the first RAT is Global System for Mobile communications (GSM) and the second RAT is Wideband Code Division Multiple Access (WCDMA).

26. The wireless communication device according to claim 14, wherein the first RAT is different from the second RAT.

27. The wireless communication device according to claim 14, further comprising a third receive chain associated with the second modem and configured to receive one or more signals from the second RAT and output the received one or more second RAT signals, to the decoder for the second modem,
wherein 3-way receive diversity is performed with the one or more second RAT signals received on the first receive chain, the second receive chain, and the third receive chain.

* * * * *